US005320020A

United States Patent [19]

Corley

[11] Patent Number: 5,320,020

[45] Date of Patent: Jun. 14, 1994

[54] MUSICAL SCALE AND CHORD DISPLAY CARDS

[76] Inventor: Steven T. Corley, 203 Yoakum Pkwy., #926, Alexandria, Va. 22304

[21] Appl. No.: 984,685

[22] Filed: Dec. 2, 1992

[51] Int. Cl.$^5$ .............................................. G03B 17/18

[52] U.S. Cl. ...................................................... 84/474

[58] Field of Search .................. 84/474, 470 R, 471 R

[56] References Cited

U.S. PATENT DOCUMENTS

| | | | |
|---|---|---|---|
| 255,979 | 4/1882 | Hauschel | 84/470 R |
| 3,481,241 | 12/1969 | Gaillard | 84/474 |
| 3,572,205 | 3/1971 | Scholfield | 84/474 |
| 3,592,099 | 7/1971 | Gibby | 84/474 X |
| 3,960,046 | 6/1976 | Choong | 84/471 R |
| 4,054,868 | 10/1977 | Rose | 84/470 R X |
| 4,314,499 | 2/1982 | Olsen | 84/485 R |
| 4,317,404 | 3/1982 | Lombardo | 84/474 |

*Primary Examiner*—Russell E. Adams
*Assistant Examiner*—P. J. Stanzione
*Attorney, Agent, or Firm*—Cushman, Darby & Cushman

[57] ABSTRACT

A set of hand-held plastic laminated disks which provide for visually displaying selected combinations of musical information such as musical notes of scales and chords. The display is composed of two disks. The top disk functions as a template and is fastened to the lower disk at the center by a metal eyelet. The lower disk displays the twelve notes of the chromatic scale on several concentric circles. Apertures on the top disk display subsets of the chromatic scale as diatonic scales or chords. By rotating the bottom disk relative to the top disk, the notes of all twelve diatonic scales and their associated chords are displayed.

15 Claims, 7 Drawing Sheets

MUSICAL SCALE AND CHORD DISPLAY CARDS

BACKGROUND OF THE INVENTION

1. Field of the Invention

This invention relates to the art of displaying technical information for music such as notes of scales and chords.

2. Background Information

There are several devices in the prior art which are used as musical teaching aids, but many of them are complex, cumbersome and costly. These devices are limited to displaying a single unit of technical information for music from each manipulation of the device. Accordingly, it would be desirable to produce a simple and compact device that simultaneously displays several related types of technical information for music, thereby revealing underlying relationships between those displayed units of musical information.

SUMMARY OF THE INVENTION

This invention's primary objective is to provide a simple device that simultaneously displays a variety of technical information for a selected musical key. This technical information for music is in the form of groups of notes representing scales and chords for the selected key. By simultaneously displaying several types of musical information, underlying relationships are immediately and graphically revealed between the displayed information. The devices existing in the prior art do not reveal any underlying relationships between musical information displayed.

The basis of the invention's design is the representation of multiple chromatic scales on concentric rings on a lower disk which is primarily hidden by a top disk. It is this representation that permits underlying structure and commonality of several units of technical information for music to be revealed. Each note of the chromatic scale is repeated along a ray emanating from the center of the disk. Each such ray terminates at the exposed periphery of the larger, lower disk. Rays of chromatic notes are at 30 degree intervals. Apertures on the smaller top disk display selected notes from the chromatic scales on the lower disk. By representing notes of scales and chords as subsets of the chromatic scale, the device simply and graphically displays the structure and commonality between the member notes of scales and chords.

One objective of the invention is to show inclusive relationships, such as, triads and chords being subsets of a particular diatonic scale which is a subset of the chromatic scale. This method of showing the relationships will appeal intuitively to the user by representing half step sound intervals as 30 degree arc distances or proportionally larger intervals. From these basic unit intervals, the user can understand the relationship between the musical notes of a selected key.

Another objective is to visually link successive notes of a particular scale or chord by notes and arcs of a particular color. The invention is small in size and light in weight, making it easy to carry and use. Prior art does not adequately meet any of the these objectives.

DETAILED DESCRIPTION OF THE INVENTION

Figure 1:
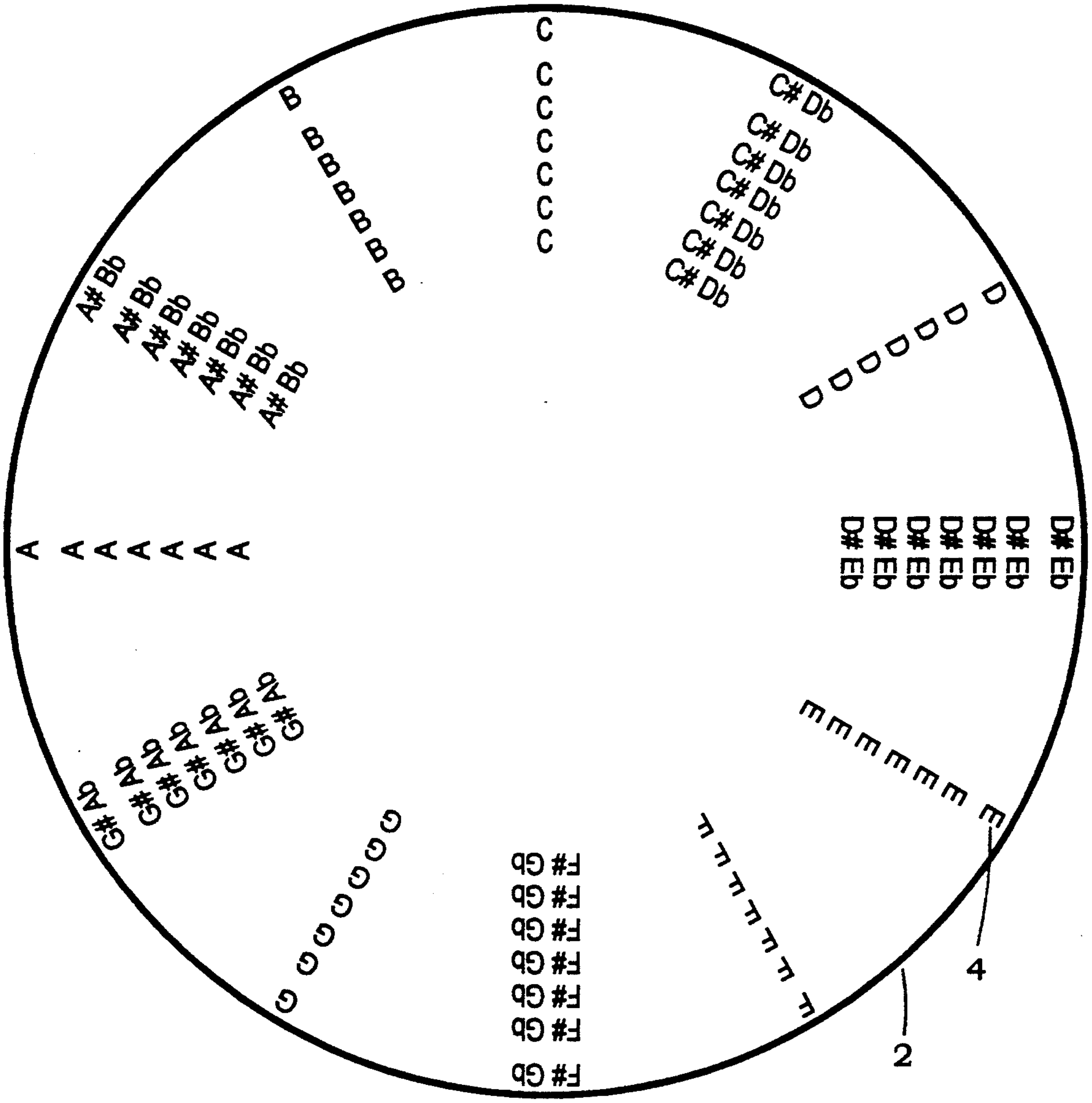
FIG. 1 is a view of the bottom disk with the chromatic scale. It is used in all implementations of the invention.

The following description is an example of a preferred embodiment of the invention. Referring to FIG. 1, the lower disk 2 contains graphics that are the basis of the device's design. The lower disk's graphics are composed of seven concentric rings with different diameters. On each ring is positioned indicia 4 corresponding to all of the twelve notes of the chromatic scale, which are represented as seven single notes and five double notes. The double notes represent the two symbols given to the same musical note, for example, a C sharp (C#) is equivalent to a D flat (Db). These notes form radial columns with the same note positioned on each concentric ring. Each of these radial columns is spaced apart by a distance of a 30 degree arc. These successive notes emanating along a ray from the center of the circle can increase in size to facilitate ease of reading and to allow for greater information content.

When the top disk is in place, the outermost ring of the bottom disk will be exposed. With this design, the entire chromatic scale is exposed as a reference. Representations of notes are positioned identically on each ring with respect to sequence and angular distance. Thus, at any one of the seven concentric rings, the following is evident at each of the twelve positions:

0 degrees (12 o'clock) corresponds to C
30 degrees (1 o'clock) corresponds to C# and Db
60 degrees (2 o'clock) corresponds to D
90 degrees (3 o'clock) corresponds to D# and Eb
120 degrees (4 o'clock) corresponds to E
150 degrees (5 o'clock) corresponds to F
180 degrees (6 o'clock) corresponds to F# and Gb
210 degrees (7 o'clock) corresponds to G
240 degrees (8 o'clock) corresponds to G# and Ab
270 degrees (9 o'clock) corresponds to A
300 degrees (10 o'clock) corresponds to A# and Bb
330 degrees (11 o'clock) corresponds to B.

Subsets of the bottom disk's printed graphic information appear as notes through apertures in each of the successive FIGS. 3 through 7.

For ease of reading, each concentric ring's twelve notes can be in a different color. Each ring's color can also correspond to the color of the arc segments and identifiers on the upper template disk.

Figure 2:
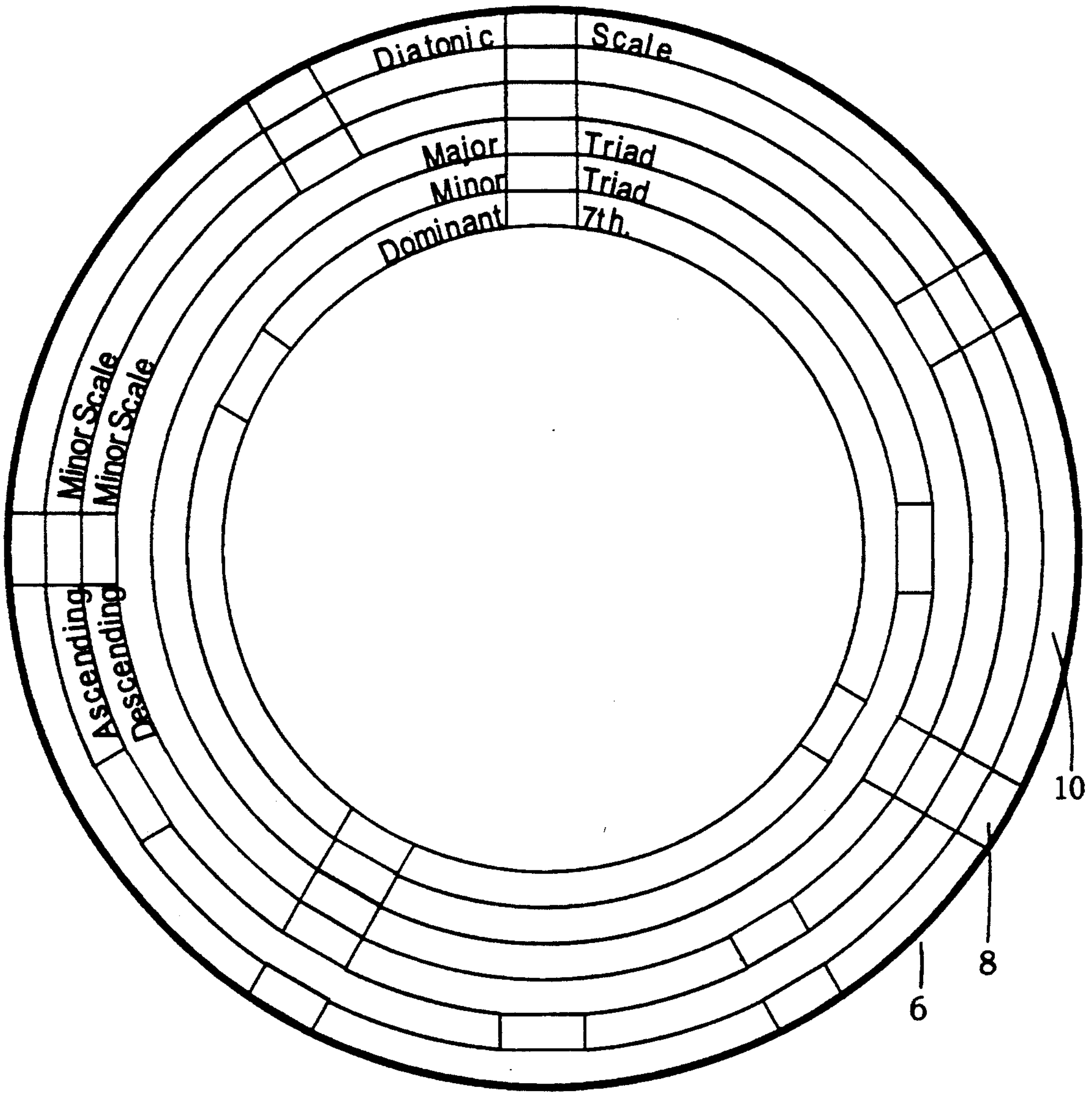
FIG. 2 is a view of a top template disk containing apertures and identifiers for the various types of musical technical information.

FIG. 2 is a view of the upper disk 6. This disk is a template with arcs 10 connecting identifiers and appropriate apertures 8 for notes of: the Major Diatonic Scale: the Ascending Minor Scale; the Descending Minor Scale; the Major Triad; the Minor Triad; and the Dominant Seventh.

Different colors for the arcs and notes of each triad or scale will enhance visual association the notes of each scale or triad. The Musical Scale and Chord Display cards invention described herein may be expanded to include representations of other scales, modes and more complex chords.

Figure 3:
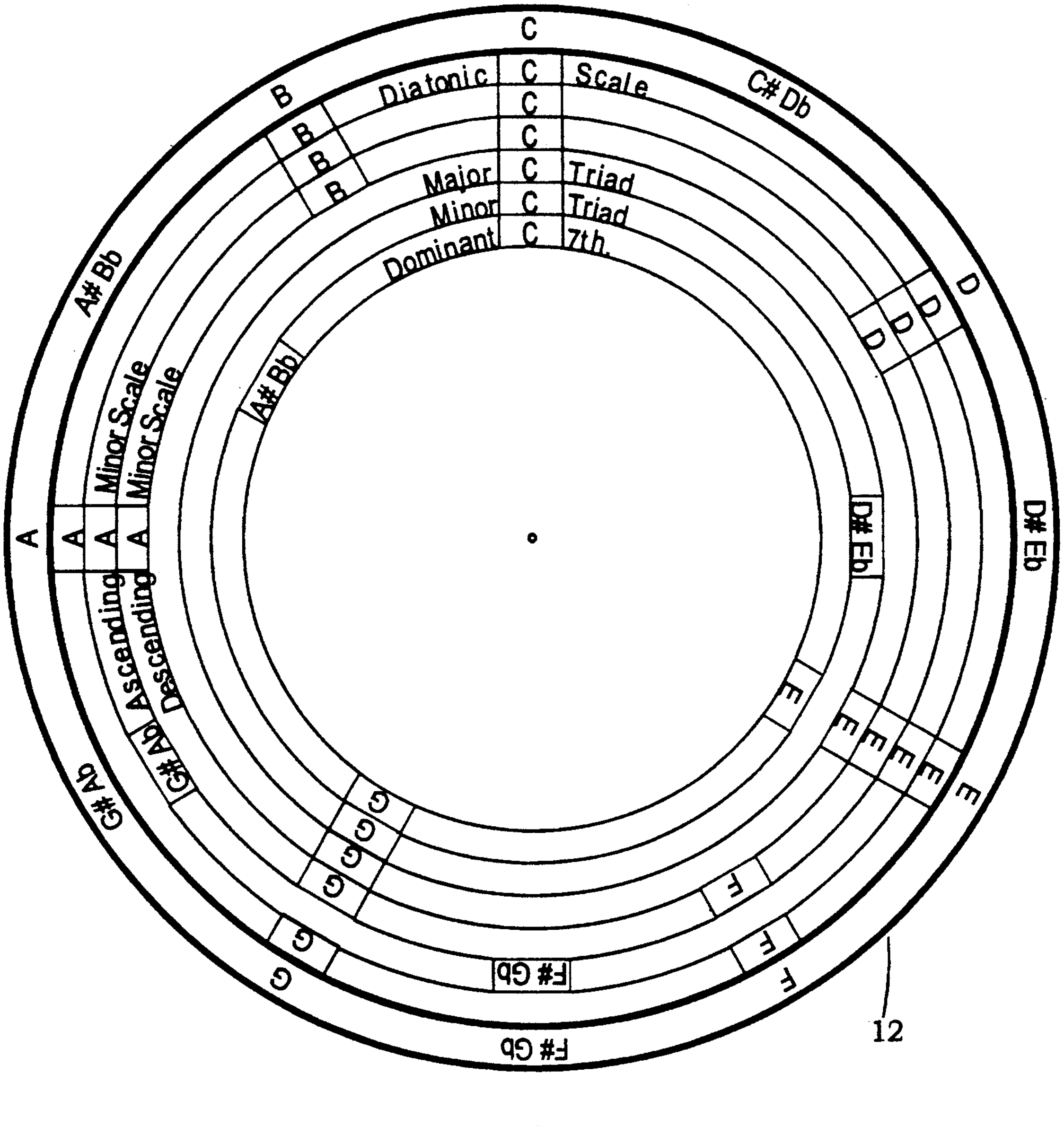
FIG. 3 is a view of the top template disk attached to the bottom disk so that the major and minor diatonic scales and triads for the key of C are displayed.

An example of the completed device is shown in FIG. 3. By using this device 12, a user can obtain information about scales, triads, etc., in the key of C. The user rotates the lower disk until the "C" appears in the outermost ring's aperture which is identified by the word "Diatonic" preceding the aperture and the word "Scale" succeeding this aperture. Any of the other diatonic major scales may be revealed by rotating the bottom disk so that the selected keys tonic note lies in the outermost ring's aperture as described above.

When the user has rotated the lower disk until "C" appears in the outermost ring's aperture with the identifiers, several relationships can be determined. First, by viewing the first and outer ring, the user sees that the "diatonic scale" consists of the notes "C", "D", "E", "F", "G", "A" and "B" (hereinafter a string of notes will be represented as C-D-E-F-G-A-B). Second, the "ascending minor scale" is displayed in the second ring and that scale consists of the notes A-B-C-D-E-F#-G#. Third, the "descending minor scale" is displayed in the third ring and that scale consists of the notes A-B-C-D-E-F-G. Fourth, the "major triad" is displayed in the fourth ring and that chord consists of the notes C-E-G. Fifth, the "minor triad" is displayed in the fifth ring and that chord consists of the notes C-Eb-G. Sixth, the "dominant 7th" is displayed in the sixth and inner ring and that chord consists of the notes C-E-G-Bb.

The user is able to see technical informational relationships among these six musical entities displayed. Prior art allows display of only one such entity thereby precluding association of notes common to the structures of a key. The user sees that the note "C" is the first degree of the major diatonic scale and the major triad. The user also sees the note "E" is the 3rd degree of the diatonic scale and the second note of the major triad. Prior art permitted no such associations, nor displayed information common to scales and triads of a particular key.

Additionally, the notes "C" and "G" are seen as common to the Diatonic Scale, Descending Minor Scale, Major Triad, Minor Triad, and Dominant Seventh. "Eb" of the Minor Triad and "Bb" of the Dominant Seventh are seen as half-step variants of the Diatonic Scale simultaneously. Also, when viewing successive apertures the intervals between notes corresponding to circular arc distance are seen. For example when viewing the diatonic major C scale (C, D, E, F, G, A, B), the half-step intervals between B and C, and between E and F are actually seen. Different colors for the identifiers, arcs and notes of each ring scale will enhance visual association of the notes belonging to the particular musical structure.

Figure 4:
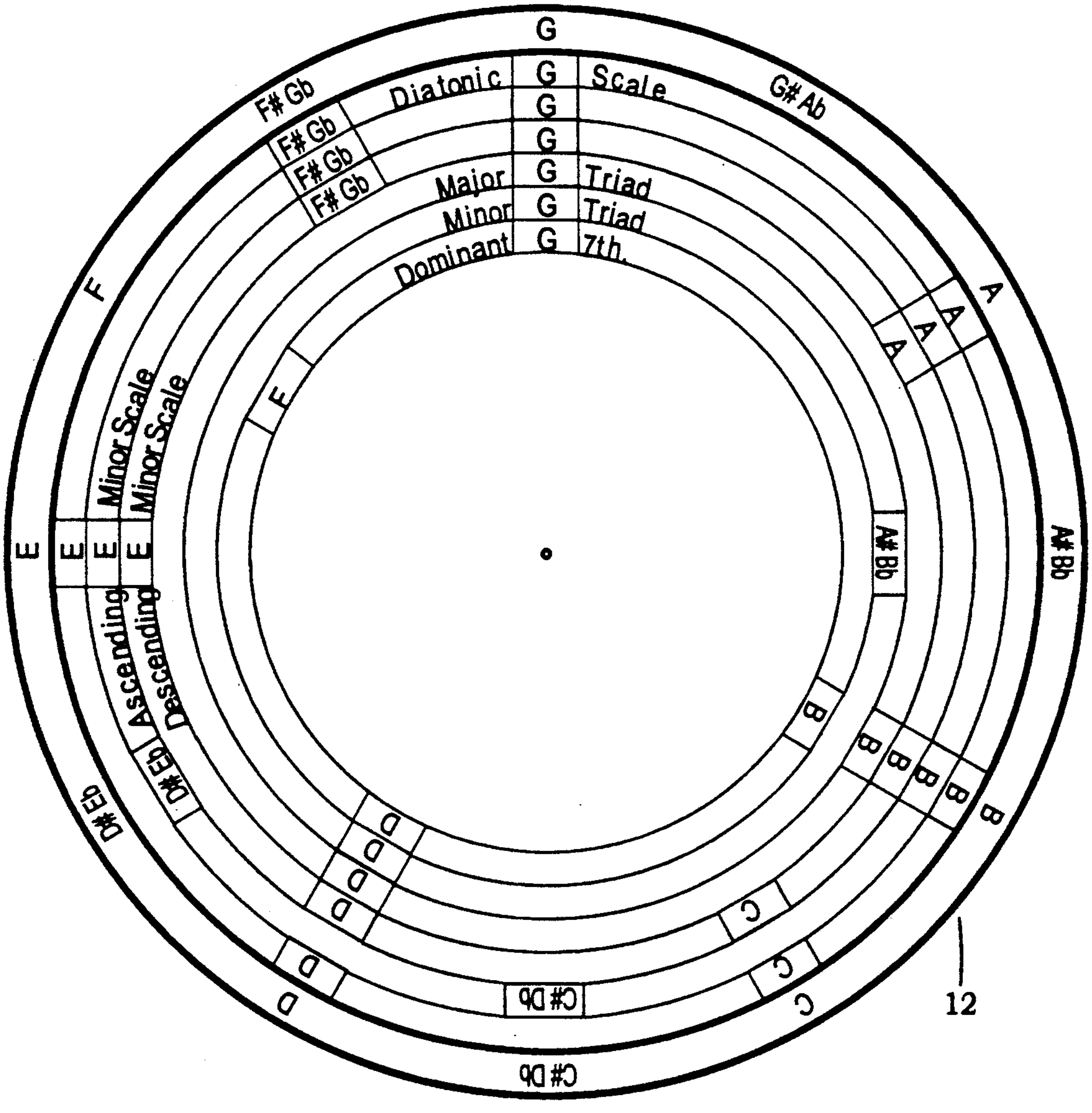
FIG. 4 is a view of two disks displaying major and minor diatonic scales and triads for the key of G.

Referring to FIG. 4, the disks have been rotated to display the information about scales, triads, etc. in the key of G. The user rotates the lower disk until the "G" appears in the outermost ring's aperture between the identifiers "Diatonic" and "Scale". After rotating the disks, the user can visually see that several relationships exist between the different scales and chords. First, by viewing the first and outer ring, the user sees that the "diatonic scale" consists of the notes G-A-B-C-D-E-F#. Second, the "ascending minor scale" is displayed in the second ring and that scale consists of the notes E-F#-G-A-B-C#-D#. Third, the "descending minor scale" is displayed in the third ring and that scale consists of the notes E-F#-G-A-B-C-D. Fourth, the "major triad" is displayed in the fourth ring and that chord consists of the notes G-B-D. Fifth, the "minor triad" is displayed in the fifth ring and that chord consists of the notes G-Bb-D. Sixth, the "dominant 7th" is displayed in the sixth and inner ring and that chord consists of the notes G-B-D-F.

Figure 5:
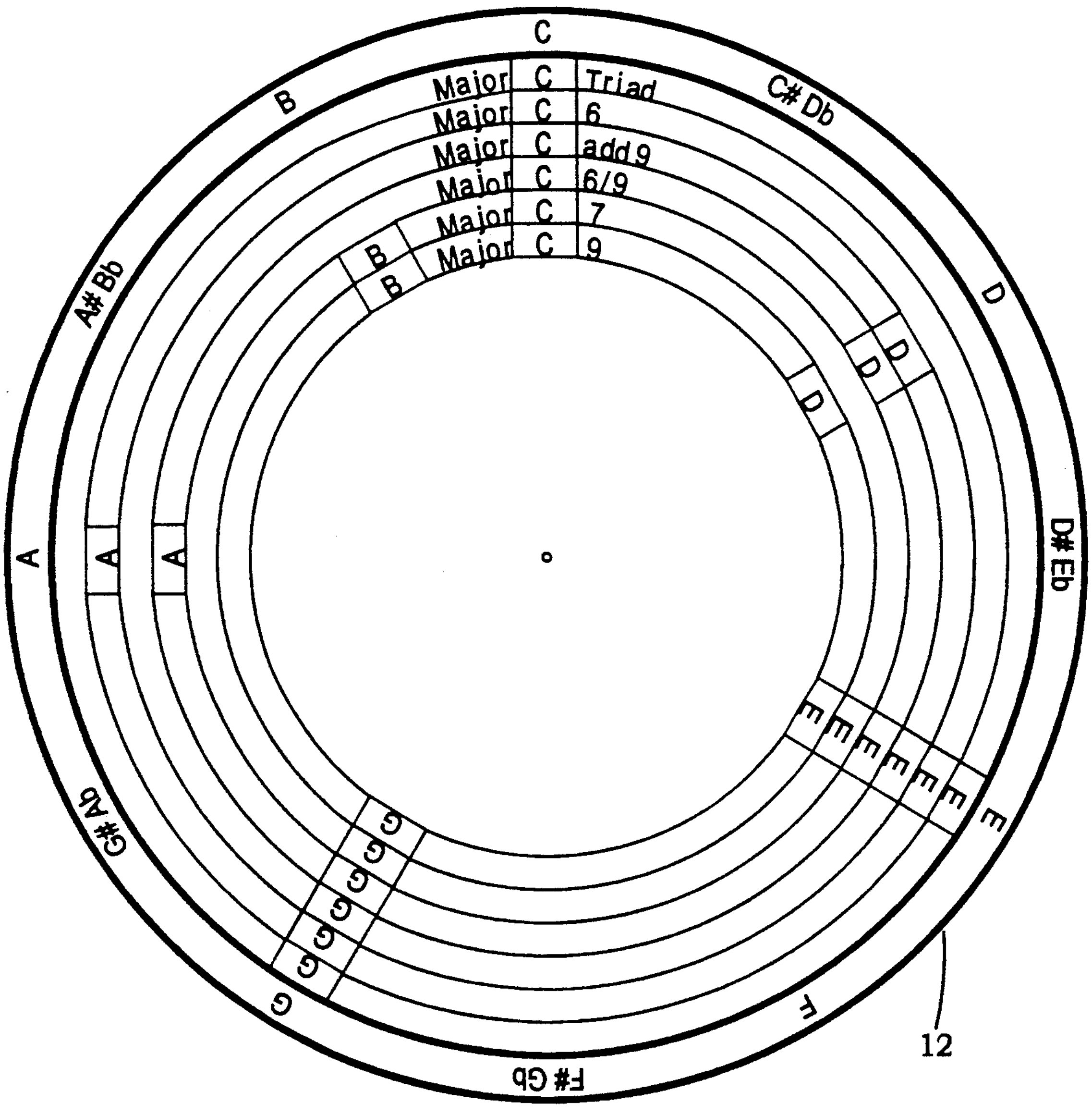
FIG. 5 is a view of two disks displaying major C chords.

Referring to FIG. 5, a new disk 12 is used to display six Major C chords. Identifiers for the Major C chords appear after the aperture showing "C" for each of the six rings. Thus in FIG. 5, the following C major chords and notes are shown: first, the Major Triad as C-E-G; second, the Major 6 as C-E-G-A; third, the Major add 9 as C-E-G-D; fourth, the Major 6/9 as C-E-G-A-D; fifth, the Major 7 as C-E-G-B; and sixth, the Major 9 as C-E-G-B-D.

Commonality among these C Major chords and differences between these C Major chords is immediately evident. Additional and more complex chords can be represented when scaling of the notes permits legible representation of additional rings.

Figure 6:
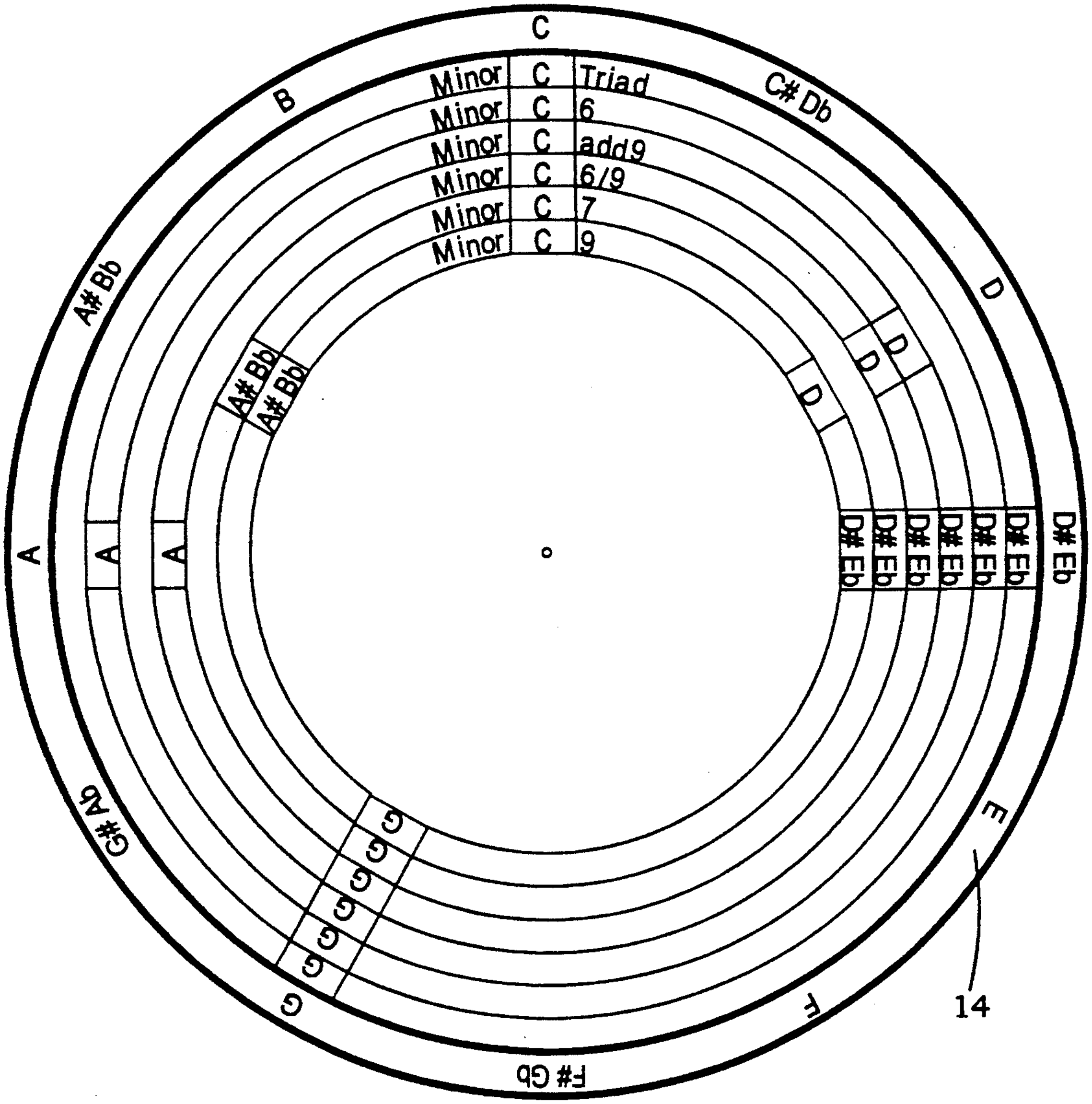
FIG. 6 is a view of two disks displaying minor C chords.

In FIG. 6, another disk 14 is used to display six Minor C chords. Identifiers for the Minor C chords appear after the aperture showing "C" for each of the six rings. Thus in FIG. 6, the following C minor chords and notes are shown: first, the Minor Triad as C-Eb-G; second, the Minor 6 as C-Eb-G-A; third, the Minor add 9 as C-Eb-G-D; fourth, the Minor 6/9 as C-Eb-G-A-D; fifth, the Minor 7 as C-Eb-G-Bb; and sixth, the Minor 9 as C-Eb-G-Bb-D.

Figure 7:
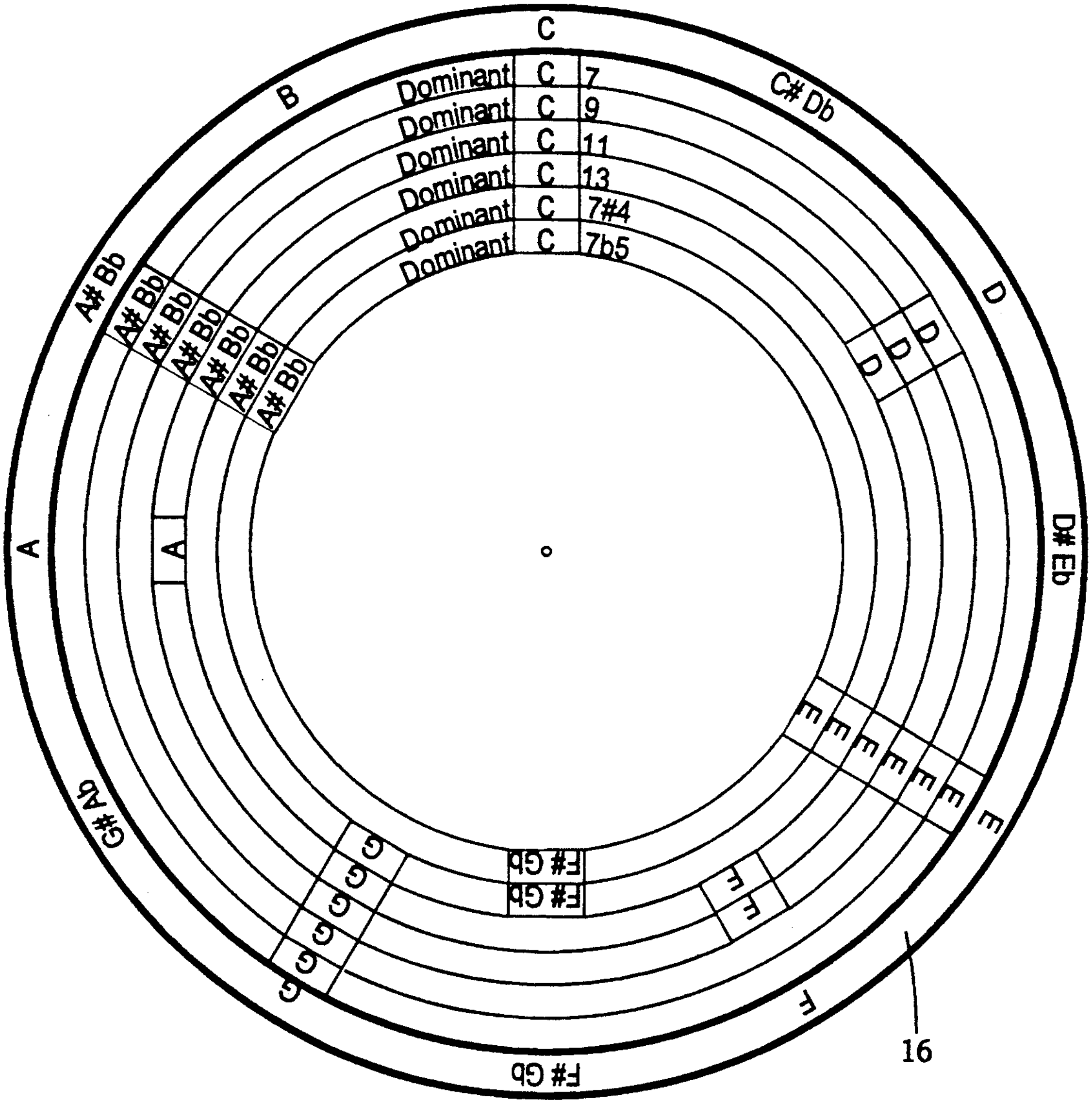
FIG. 7 is a view of two disks displaying dominant C chords.

Referring to FIG. 7, the disk 16 is used to display six Dominant C chords. Identifiers for the Dominant C chords appear after the aperture showing "C" for each of the six rings. Thus in FIG. 7, the following C dominant chords and notes are shown: first, the Dominant 7 as C-E-G-Bb; second, the Dominant 9 as C-E-G-Bb-D; third, the Dominant 11 as C-E-G-Bb-D-F; fourth, the Dominant 13 as C-E-G-Bb-D-F-A; fifth, Dominant 7#4 as C-E-F#-G-Bb; and sixth, the Dominant 7b5 as C-E-Gb-Bb.

It should be understood that the foregoing description relates to only preferred embodiments of the present invention, and that it is intended to cover all changes and modifications of the embodiment of the invention herein used for the purposes of disclosure, which do not institute departures from the spirit and scope of the invention.

What is claimed is:

1. An apparatus for displaying musical scales and chords comprising:

a bottom member having concentric rings of different diameters, each concentric ring has indicia corresponding to the twelve notes of the chromatic scale and said indicia is spaced at a thirty degree arc from an adjacent indicia, the concentric rings are aligned so that a radial column of said indicia corresponding to one of the twelve notes of the chromatic scale is formed;

a top member having concentric circles of different diameters having apertures placed at specific locations to reveal said indicia on said bottom plate to display a relationship between said notes of the chromatic scale;

a connector which attaches said top member to said bottom member and allows said members to rotate relative to each other.

2. An apparatus as claimed in claim 1, wherein said apertures on said concentric circles of said top member display said indicia corresponding to the notes for the diatonic scales on a first concentric circle, the ascending minor scale on a second concentric circle, the descending minor scale on a third concentric circle, the major triad on a fourth concentric circle, the minor triad on a fifth concentric circle and the dominant 7th on a sixth concentric circle.

3. An apparatus as claimed in claim 1, wherein said apertures on said concentric circles of said top member display said indicia corresponding to the notes for the major triad on a first concentric circle, the major 6 on a second concentric circle, the major add 9 on a third concentric circle, the major 6/9 on a fourth concentric circle, the major 7 on a fifth concentric circle and the major 9 on a sixth concentric circle.

4. An apparatus as claimed in claim 1, wherein said apertures on said concentric circles of said top member display said indicia corresponding to the notes for the minor triad on a first concentric circle, the minor 6 on a second concentric circle, the minor add 9 on a third concentric circle, the minor 6/9 on a fourth concentric circle, the minor 7 on a fifth concentric circle and the minor 9 on a sixth concentric circle.

5. An apparatus as claimed in claim 1, wherein said apertures on said concentric circles of said top member display said indicia corresponding to the notes for the dominant 7 on a first concentric circle, the dominant 9 on a second concentric circle, the dominant on a third concentric circle, the doiminant 13 on a fourth concentric circle, the dominant 7#4 on a fifth concentric circle and the dominant 7b5 on a sixth concentric circle.

6. An apparatus as claimed in claim 1, wherein said bottom member and said top member have an outer shape which is round.

7. An apparatus as claimed in claim 1, wherein said bottom member and said top member are made of paper.

8. An apparatus as claimed in claim 7, wherein said paper is laminated.

9. An apparatus as claimed in claim 1, wherein said bottom member and said top member are made of plastic.

10. An apparatus as claimed in claim 1, wherein said connector is a rivet.

11. An apparatus for displaying musical scales and chords comprising:

a bottom member having concentric rings of different diameters, each concentric ring has indicia corresponding to the twelve notes of the chromatic scale and said indicia is spaced at a thirty degree arc from an adjacent indicia, the concentric rings are aligned so that a radial column of said indicia corresponding to one of the twelve notes of the chromatic scale is formed;

a first top member having concentric circles with apertures placed at specific locations to reveal said indicia on said bottom plate to display a relationship between said notes, said apertures display the indicia corresponding to the notes for the diatonic scales on a first concentric circle, the ascending minor scale on a second concentric circle, the descending minor scale on a third concentric circle, the major triad on a fourth concentric circle, the minor triad on a fifth concentric circle and the dominant 7th on a sixth concentric circle;

a second top member having concentric circles with apertures placed at specific locations to reveal said indicia on said bottom plate to display a relationship between said notes, said apertures display said indicia corresponding to the notes for the major triad on a first concentric circle, the major 6 on a second concentric circle, the major add 9 on a third concentric circle, the major 6/9 on a fourth concentric circle, the major 7 on a fifth concentric circle and the major 9 on a sixth concentric circle;

a third top member having concentric circles with apertures placed at specific locations to reveal said indicia on said bottom plate to display a relationship between said notes, said apertures display said indicia corresponding to the notes for the minor triad on a first concentric circle, the minor 6 on a second concentric circle, the minor add 9 on a third concentric circle, the minor 6/9 on a fourth concentric circle, the minor 7 on a fifth concentric circle and the minor 9 on a sixth concentric circle;

a fourth top member having concentric circles with apertures placed at specific locations to reveal said indicia on said bottom plate to display a relationship between said notes, said apertures display said indicia corresponding to the notes for the dominant 7 on a first concentric circle, the dominant 9 on a second concentric circle, the dominant 11 on a third concentric circle, the doiminant 13 on a fourth concentric circle, the dominant 7#4 on a fifth concentric circle and the dominant 7b5 on a sixth concentric circle;

a connector which allows said bottom member to be attached and detached from said first top member, from said second top member, from said third top member, and from said fourth top member, said connector allows said bottom member to circularly rotate relative to the attached said first top member, said second top member and said third top member.

12. An apparatus as claimed in claim 11, wherein the bottom member, said first top member, said second top member and said third top member have an outer shape which is round.

13. An apparatus as claimed in claim 11, wherein said bottom member, said first top member, said second top member and said third top member are made of paper.

14. An apparatus as claimed in claim 13, wherein said paper is laminated.

15. An apparatus as claimed in claim 11 wherein said bottom member, said first top member, said second top member and said third top member are made of plastic.

* * * * *